UNITED STATES PATENT OFFICE.

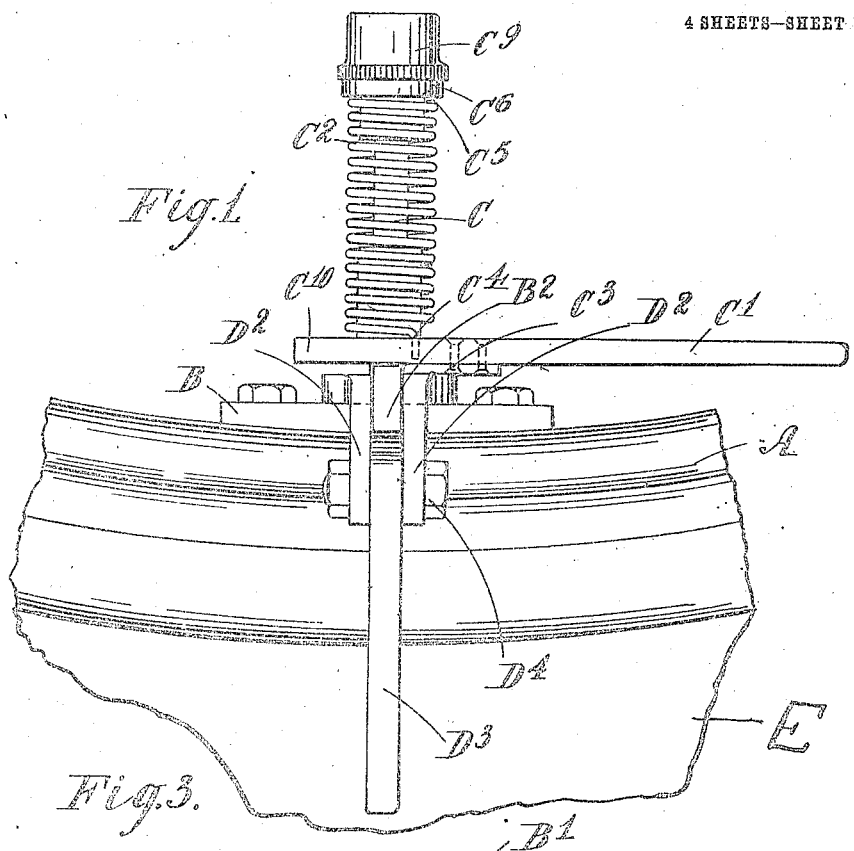

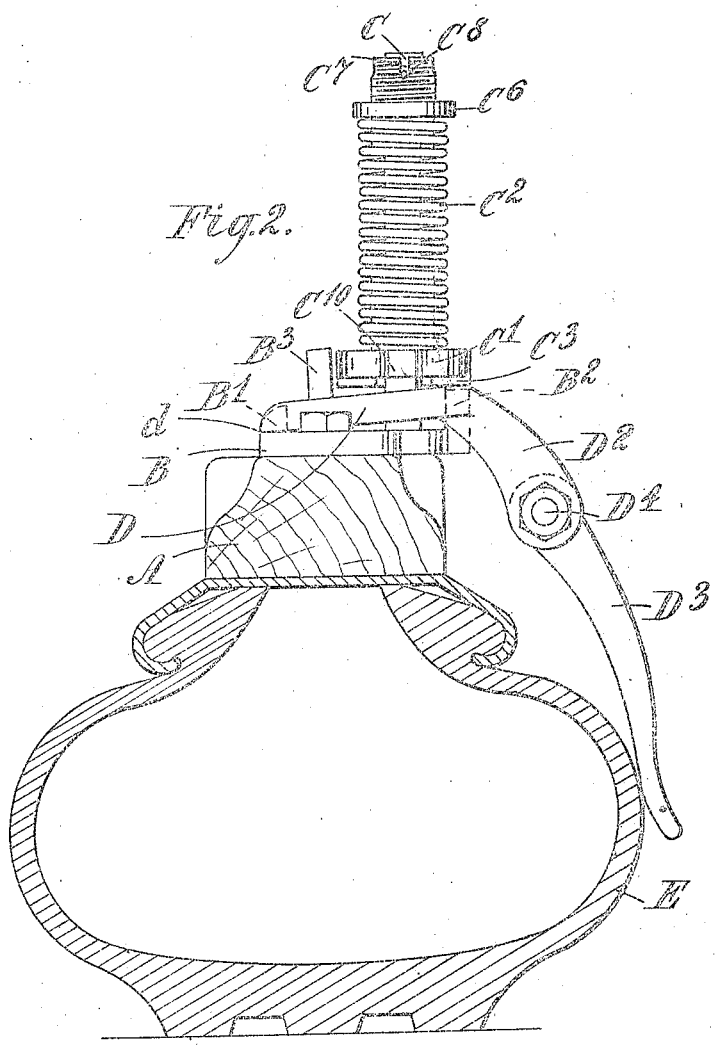

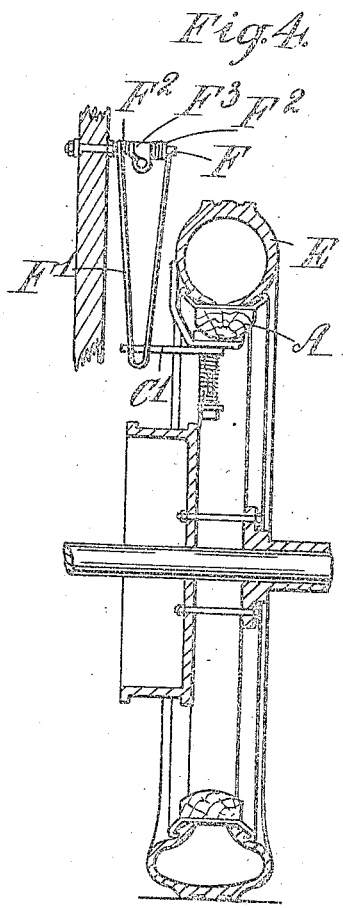

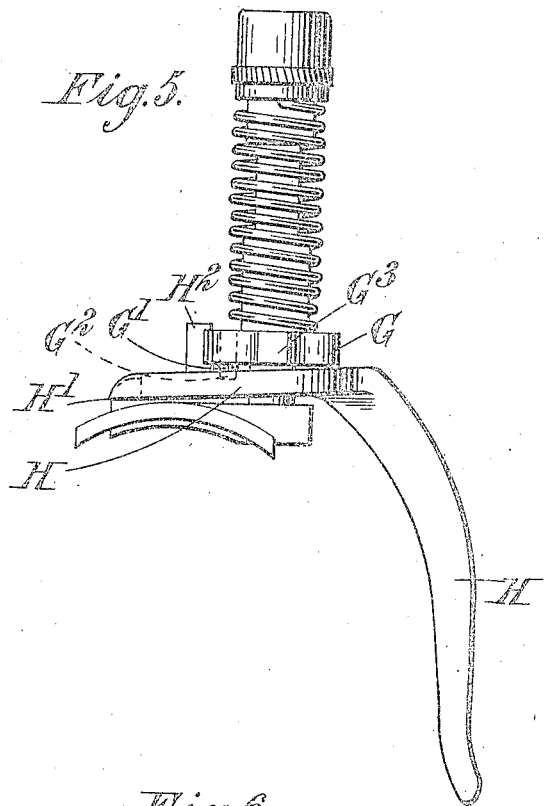
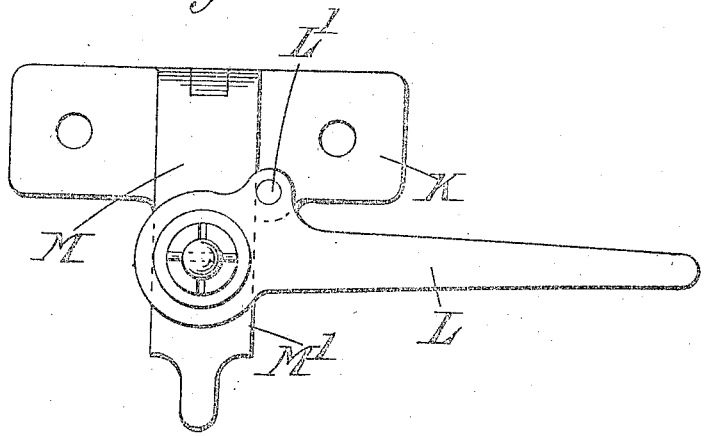

THOMAS SLOPER AND ROBERT SLOPER, OF DEVIZES, ENGLAND.

INDICATING DEVICE FOR USE WITH PNEUMATIC TIRES.

No. 902,693.     Specification of Letters Patent.     Patented Nov. 3, 1908.

Application filed October 5, 1907. Serial No. 396,079.

*To all whom it may concern:*

Be it known that we, THOMAS SLOPER and ROBERT SLOPER, subjects of the King of England, residing at Devizes, Wiltshire, England, have invented certain new and useful Improvements in Indicating Devices for Use with Pneumatic Tires, of which the following is a specification.

This invention is for improvements in indicating devices for use with pneumatic tires and has for its object to give an audible signal should the tire with which the apparatus is used become entirely or partially deflated.

As is well-known when a tire becomes deflated, that part which is in contact with the road is deformed, that is to say, it expands laterally beyond its normal limits. It has before been proposed to utilize this lateral expansion to operate an audible signal and the present invention relates to improved mechanism for this purpose.

According to one method of carrying out this invention a loaded member is employed and so arranged that it is released by the deformation of the tire from its inoperative position whereupon it advances into and remains in the operative position irrespective of any subsequent change in the shape of the tire.

Those parts of the apparatus which coöperate with the tire are necessarily carried on the road-wheel where they are exposed to dust and dirt, as will be readily understood, and an important feature of this invention consists in so arranging the parts that they are displaced by the deformation of the tire before they are brought into operative position. This prior displacement has the effect of breaking away any incrustation of dirt that may have collected on the movable parts so that they are left free to operate as hereinafter described. In the preferred form the mechanism employed comprises a loaded member that always tends to move laterally relatively to the wheel but is restrained from such movement by a stop. A second member is situated in proximity to the side of the tire and is so connected with the first that when the tire becomes deformed by deflation it first displaces the loaded member and then frees it from engagement with its stop so that it can advance into the operative position. The loaded member conveniently takes the form of an arm pivoted to the felly of the wheel, and when moved laterally, relatively to the wheel, it is brought into the path of a second member secured to the vehicle and against which it strikes as the wheel rotates thereby giving an audible signal, but so long as the loaded member is held back by the stop, it does not come into contact with the member on the vehicle.

In the accompanying drawings, Figure 1 is a front elevation of that part of the apparatus which is carried by the road wheel, the loaded members being shown in the inoperative position, Fig. 2 is a side elevation of the same parts showing the loaded member displaced prior to its coming into the operative position. Fig. 3 is a plan of Fig. 1, but with the loaded member in the operative position. Fig. 4 shows the whole apparatus in side elevation with the parts operative. Fig. 5 is a side elevation of the parts in the position shown in Fig. 2 but slightly modified in construction, and Fig. 6 is a plan showing yet another modification.

Like letters indicate like parts throughout the drawings.

On the felly A is a plate B having a lug $B^1$ situated near one side of the felly and a stop $B^2$ which is situated in proximity to the other side of the felly. Between the lug and stop a radially disposed spindle C is mounted. Over the spindle C a plate D is placed, one end of which has a recess or jaw as at $D^1$ to engage the lug $B^1$ while the other end is forked and is extended to form an arm $D^2$. The arm $D^2$ carries an adjustable extension $D^3$ which projects beyond the felly and lies in proximity to the tire as shown at E, although when the latter is properly inflated it preferably does not come into contact with the same.

Pivoted on the spindle C is an arm $C^1$ and this is normally maintained in position against the plate D by a spring $C^2$. On that face of the arm which is towards the plate D is a lug $C^3$. The pin $B^2$ already referred to as carried on the plate B extends through the forked end $D^2$ of the plate D and projects beyond the plate so that it may engage the lug $C^3$ on the arm $C^1$. The spring $C^2$ in addition to normally maintaining the arm $C^1$ against displacement radially of the wheel is connected at $C^4$ to the arm and at $C^5$ to a head $C^6$ carried fast on the spindle C. This head is slotted as at $C^7$ and the slots are engaged by a cross-pin $C^8$ mounted in the spindle so that the head may be turned to any desired position for the purpose of putting a torque upon the spring and then the pin inserted to retain the spring under tension. The head C³ is screw-threaded to receive a cap C⁹ whereby the pin is prevented from displacement.

Normally the arm C¹ is in the position shown in Fig. 1 and when in this position the lug C³ lies to one side of the stop or pin B² on the plate B and the spring C² tends to advance the arm past the stop, that is, to move it laterally of the wheel in a clockwise direction, see Fig. 3; in this figure the arm has been advanced into the lateral position.

Secured to any convenient part of the vehicle by a rod F is a sounder F¹. This is conveniently formed of a loop of wire, the ends of which are bent round into the form of spirals as at F² and secured to a lug F³ fast on the spindle.

When the arm or striker C¹ is in the inoperative position already referred to (Fig. 1) it does not come into contact with the sounder F¹ but when moved laterally into the position shown in Fig. 3, it strikes the sounder F¹ at each rotation of the wheel and thereby gives an audible signal to the driver of the vehicle.

The release of the arm C¹ is effected as follows:—The parts D, D² and D³ constitute a lever which, to all intents and purposes, is hinged to the plate B at d. When the tire becomes deflated, that part which is in contact with the road expands laterally, and in so doing comes into contact with and displaces the end D³ of this lever. The lever thus turns upon its fulcrum d and in so doing displaces in a radial direction the arm C¹ and compresses the spring C². This movement has a two-fold function, (a) to loosen the arm and spring in case these parts should have become clogged with dirt and (b) to lift the arm C¹ above the stop B² so that it is free to advance laterally relatively to the wheel under the action of the spring C². The arm has a stop C¹⁰ which engages a pin B³ carried by the plate D whereby the angular movement of the arm is limited so that it is finally brought by the spring C² into a position approximately at right angles to the plane of the wheel.

The spring C² is preferably arranged to advance the arm C¹ towards the sounder F¹ so that the spring affords a yielding support for the arm in order that the latter may give as it strikes the sounder F¹. The coiled ends F² of the sounder F¹ also serve to render this member resilient and this is of special utility should the car be reversed while the arm C¹ is in the operative position, as in such case the arm being against the pin B³ would be unyielding so that the sounder F¹ would have to yield in order that the parts might pass each other.

The end D³ of the lever D D² D³ is connected to the part D² by a bolt and nut D⁴ in order that the distance at which it is set from the tire may be adjusted, but it will be understood that this adjustment may be dispensed with and the whole made in one piece if desired. The sounder F¹ obviously may be made of a single resilient member if desired with or without a spiral end to it instead of having the looped form shown.

Instead of the arm C¹ having a lug C³ which engages a stop B² on the plate B, it will be seen that this arm, the equivalent of which is shown at G (Fig. 5) may carry a pin G¹ arranged to engage a recess G² in the upper face of the plate H which corresponds to the plate D (Figs. 1 to 4).

In Fig. 5 the plate H is shown in the position it would take when operated by the lateral expansion of the tire owing to deflation, that is to say, it is tilted about the fulcrum H¹ and consequently has forced back the arm G against its spring. This has the effect of lifting the pin G¹ out of the recess in the plate H and thus the arm is allowed to turn under the action of its spring until its lug G³ is arrested against the stop H² on the base plate H. Again, instead of the pin in the arm engaging the plate or lever H it may engage the fixed plate K (Fig. 6). In this figure the pin L¹ is carried in the arm L in such position that it clears the plate or lever M but enters a recess in the plate K. When the lever M is raised as has been described with reference to the lever D D² D³ the pin L¹ is lifted out of its recess and thus the arm L is allowed to swing round until the pin comes into contact with the face M¹ of the lever M. This arrangement is the cheapest to construct as it contains fewer parts, the pins or lugs B² and B³ being both dispensed with and if the lever M be made in one piece instead of having an adjustable end such as D³ (Figs. 1 and 4) the number of parts is still further decreased. The lever H in Fig. 5 is shown thus constructed in one piece.

The sounder F¹ or its equivalent instead of being secured to some part of the vehicle such as the frame of the chassis can, if desired, be secured to the mud guard of the wheel and it may be constructed in any suitable manner for this purpose. In this case the mud guards of the car act as resonators and considerably augment the sound.

Without limiting ourselves to the exact details of the construction of apparatus illustrated, what we claim as our invention and desire to secure by Letters Patent is:—

1. In a deflation indicator the combination with a road wheel of a vehicle and a non-rotating part of the vehicle, of a sounder carried by one of said elements, a striker carried by the other element and free to be advanced into the path of the sounder, means for normally retaining the striker free of the sounder, a pneumatic tire on the wheel, and means, adapted to be operated by excessive lateral deformation of the tire, for displacing the striker and moving it into the path of the sounder, substantially as set forth.

2. In a deflation indicator the combination with a road wheel of a vehicle and a non-rotating part of the vehicle, of a sounder carried by one of said elements, a loaded member carried by the other element and tending always to advance into the path of the sounder, a catch that normally retains the loaded member free of the sounder, a pneumatic tire on the wheel, and means for utilizing excessive lateral deformation of the tire to impart relative movement to the catch and loaded member for the purpose of releasing the latter, substantially as set forth.

3. In a deflation indicator the combination with a road wheel of a vehicle and a non-rotating part of the vehicle, of a sounder carried by one of said elements, a striker carried by the other element and free to be advanced into the path of the sounder, means for normally retaining the striker free of the sounder, a pneumatic tire on the wheel, means adapted to be operated by excessive lateral deformation of the tire, for displacing the striker and moving it into the path of the sounder, and a stop to limit the degree of displacement of the striker, substantially as set forth.

4. In a deflation indicator the combination of, a vehicle frame, a road-wheel, a sounder carried by one of said elements, a loaded member carried by the other element and tending always to advance into the path of the sounder, a catch that normally retains the loaded member free of the sounder, a pneumatic tire on the wheel, and means, adapted to be operated by excessive lateral deformation of the tire, for imparting relative movement to the catch and loaded member to release the latter, such means being so arranged that the loaded member and its co-operating parts are positively shifted prior to the release for the purpose set forth.

5. In a deflation indicator the combination of, a vehicle frame, a road-wheel, a sounder carried by one of these elements, a spring-controlled lever pivoted to the other element and tending always to advance into the path of the sounder by turning about its pivot, the lever being also movable along its pivot, a stationary catch that normally retains the lever free of the sounder, a pneumatic tire on the wheel, and means for utilizing excessive lateral deformation of the tire to displace the lever along its pivot until it is free of the catch, substantially as set forth.

6. In a deflation indicator the combination of, a vehicle frame, a road-wheel, a sounder carried by the frame, an approximately radial stud carried by the wheel, a lever pivoted to this stud, a spring that tends always to advance the lever into the path of the sounder by turning it upon its pivot, a catch that normally retains the lever free of the sounder, a pneumatic tire on the wheel, and means for utilizing excessive lateral deformation of the tire to impart relative movement to the catch and lever for the purpose set forth.

7. In a deflation indicator the combination of, a vehicle frame, a road-wheel, a sounder carried by the frame, an approximately radial stud carried by the wheel, a lever pivotally carried on the stud and also movable along the same, a spring carried by the stud to normally retain the lever at one end thereof and also to advance the same in a rotary direction into the path of the sounder, a catch that normally prevents rotary movement of the lever and thus retains it free of the sounder, a pneumatic tire on the wheel, and means for utilizing excessive lateral deformation of the tire to move the lever along the pin against the action of its spring until it is free of the catch, for the purpose set forth.

8. In a deflation indicator the combination of, a vehicle frame, a road-wheel, a sounder carried by the frame, an approximately radial pin carried by the road-wheel, a lever pivotally carried on the pin and also movable along the same, a spring carried by the pin to normally retain the lever at one end thereof and also to advance the same in a rotary direction into the path of the sounder, a catch that normally prevents rotary movement of the lever and thus retains it free of the sounder, a pneumatic tire on the wheel, an operating member free to swing about an axis approximately at right angles to that about which the spring-controlled lever turns and having engagement with the lever, one portion of the operating member being situated in proximity to the side of the tire so that excessive lateral deformation of the latter displaces this member and causes it to move the pivoted lever along its pin until free of the catch, for the purpose set forth.

9. In a deflation indicator the combination of, a vehicle frame, a road-wheel, a sounder carried by the frame, an approximately radial stud carried by the road-wheel, a lever pivotally carried on the stud, and also movable along the same, a spring carried by the stud to normally retain the lever at one end thereof and also to advance the same in a rotary direction into the path of the sounder, a catch that normally prevents rotary movement of the lever and thus retains it free of the striking piece, a pneumatic tire on the wheel, an operating member free to swing about an axis approximately at right angles to that about which the spring controlled lever turns and having engagement with the lever, and an adjustable end portion ($D^3$) secured to the operating member and situated in proximity to the side of the tire so that excessive lateral deformation of the tire imparts movement to the operating member and causes it to displace the pivoted lever until it is free of the catch, for the purpose set forth.

10. In a deflation indicator the combination of, a vehicle frame, a road-wheel, a sounder carried by one of these elements, a loaded member carried by the other element and tending always to advance into the path of the sounder, one of said coöperating members being resilient so that when brought into contact they can pass each other, a catch that normally retains the loaded member free of the sounder, a pneumatic tire on the wheel, and means for utilizing excessive lateral deformation of the tire to impart relative movement to the catch and loaded member substantially as set forth.

11. In a deflation indicator the combination of, a vehicle frame, a road-wheel, a sounder carried by the frame, an approximately radial stud carried by the road-wheel, a pneumatic tire on the wheel, a bell-crank lever one arm of which takes over the stud and bears against a suitable support that lies approximately parallel to the inner face of the rim of the road-wheel, the other arm of the lever extending down into proximity to the side of the tire so that it is displaced by excessive lateral deformation of the tire, being tilted upon the extremity of that arm that takes over the stud, means to prevent rotary movement of the bell-crank lever about the stud, a lever pivotally carried on the stud and also movable along the same, a spring carried by the stud to normally retain the lever at one end thereof and in contact with the arm of the bell-crank lever that takes over the stud, such spring also tending to advance the lever in a rotary direction into the path of the sounder, and a catch that normally prevents rotary movement of the lever and thus retains it free of the sounder, such catch being so disposed that displacement of the bell-crank lever carries the spring-controlled lever along the stud until it is free of the catch, substantially as set forth.

12. The combination with a wheeled vehicle, of a deflation indicator comprising a sounder and a striker, one of the said devices being adjustably mounted on a wheel of the vehicle and adapted when in one position to contact with the other at each revolution of the wheels, a pneumatic tire on said wheel, means for normally maintaining said adjustable device in position where it will not contact with the other as the wheel rotates, and means adapted, under excessive lateral deformation of the tire, to shift said adjustable device to operative position.

13. The combination with a wheeled vehicle, of a deflation indicator comprising a sounder and a striker, one of said devices being adjustably mounted on a wheel of the vehicle and adapted when in one position to contact with the other at each revolution of the wheel, means constantly acting to hold the adjustable device in such operative position, a pneumatic tire on said wheel, means for normally locking said adjustable device in position where it will not contact with the other as the wheel rotates, and means for automatically releasing said adjustable device and permitting it to move to operative position when the tire is deflated sufficiently to cause an undesirable lateral deformation thereof.

14. The combination with a wheeled vehicle, of a deflation indicator comprising a sounder and a striker, one of said devices being pivotally mounted on a wheel of the vehicle and adapted when in one position to contact with the other at each revolution of the wheel, a spring connected with said pivoted device and acting to turn into such operative position, a catch for normally holding said spring pressed device in inoperative position, and means for releasing said device from its catch when the tire is deflated sufficiently to cause an undesirable lateral deformation thereof.

In testimony whereof we have signed our names to this specification in the presence of two subscribing witnesses.

THOMAS SLOPER.
ROBERT SLOPER

Witnesses:
H. D. JAMESON,
T. L. RAND.